(No Model.)
J. F. BENNETT.
APPARATUS FOR SEPARATING NITROGEN FROM ATMOSPHERIC AIR.
No. 281,002.                    Patented July 10, 1883.
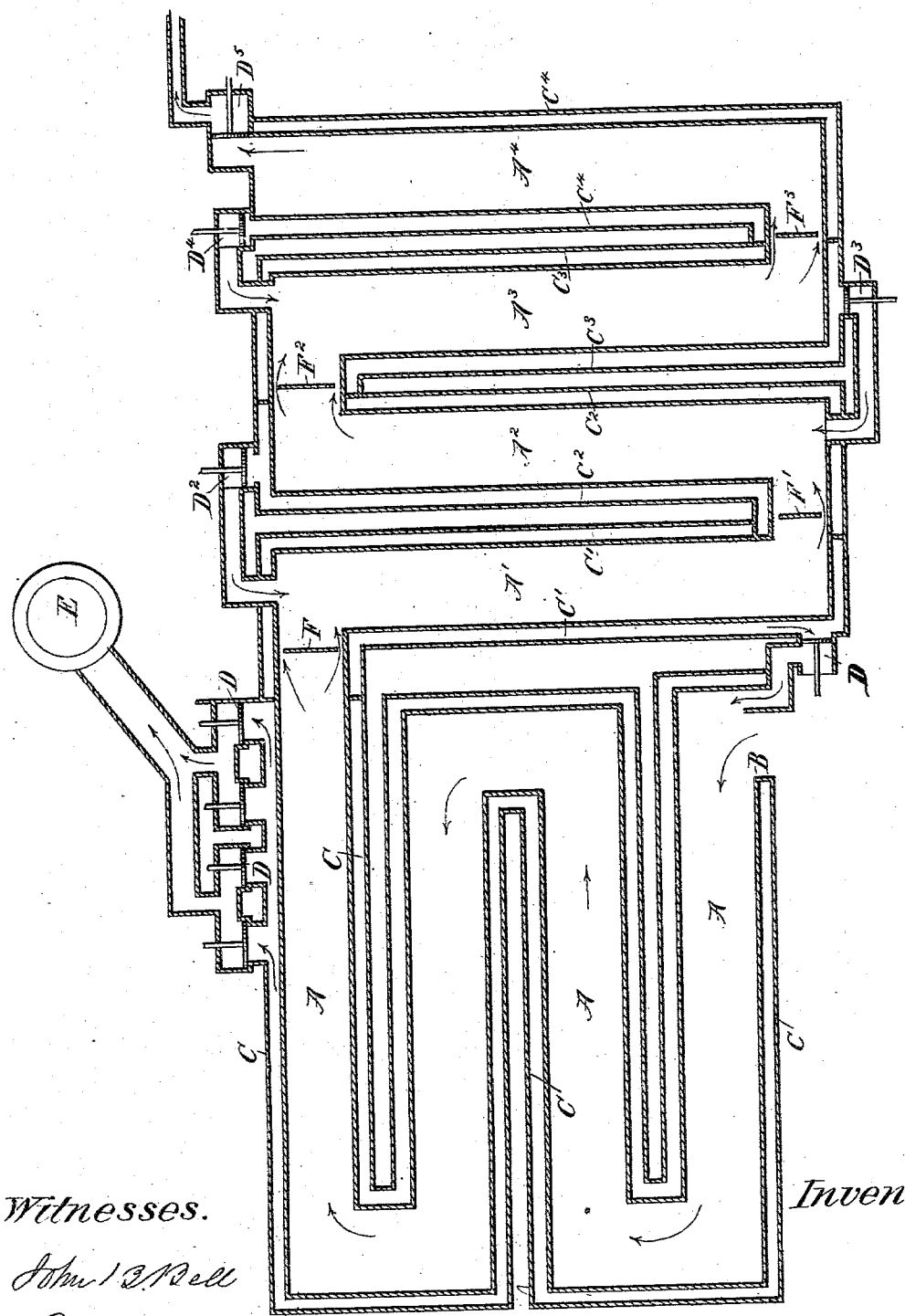
Witnesses.                                           Inventor.
John B. Bell
James M. Bell                              John Francis Bennett.

UNITED STATES PATENT OFFICE.

JOHN FRANCIS BENNETT, OF PITTSBURG, PENNSYLVANIA.

APPARATUS FOR SEPARATING NITROGEN FROM ATMOSPHERIC AIR.

SPECIFICATION forming part of Letters Patent No. 281,002, dated July 10, 1883.

Application filed September 6, 1882. (No model.)

*To all whom it may concern:*

Be it known that I, JOHN FRANCIS BENNETT, of Pittsburg, in the county of Allegheny and State of Pennsylvania, have invented or discovered a new and useful improvement in a process and apparatus for removing part of the nitrogen from the atmospheric air, and thus rendering the remainder more useful in those arts in which atmospheric air is employed as one of the elements of combustion; and I do hereby declare the following to be a full, clear, concise, and exact description thereof, reference being had to the accompanying drawings, making a part of this specification, in which like letters indicate like parts.

It is known that gases of different densities diffuse themselves through each other with velocities proportioned to their densities, those of less density traveling with the greater velocity, and that mixed gases strained through a porous plug pass through it into a receptacle that is a vacuum or approaching to a vacuum with different velocities regulated by their specific gravities, those of less density traveling with the greater velocity. I take advantage of this law of nature to separate the nitrogen of the atmospheric air (which forms about four-fifths of it in volume) in great part from the oxygen of it, (which latter forms about one-fifth of it in volume,) thus leaving the oxygen containing a much smaller proportion of nitrogen, and so more useful in those arts in which high heat is desirable, by a process and apparatus which I proceed to describe as follows:

A is a cylindrical tube, four hundred feet long and eighteen feet inside diameter, made of iron woven-wire net-work, with suitable frame-work to keep it in shape and position, covered with plaster-of-paris stucco, B, four inches thick, with suitable arrangement to prevent the casing of stucco from dropping off and to withstand a pressure of suction on its outside of about three pounds per square inch. This tube or chamber is about two hundred and fifty-four square feet in area, twenty-two thousand six hundred and nineteen square feet superficial area of inside wall, one hundred and one thousand seven hundred and eighty-seven cubical feet capacity.

C is an outer cylindrical tube, four hundred feet long and twenty-three feet diameter, made of plate-iron, air-tight, and capable of withstanding a pressure of about three pounds on each square inch of its outer surface, placed outside the stucco tube and at about two and a half feet from it. The outer cylinder is attached to the inner one at both ends by air-tight plate-iron walls. Near the farthest end are suction-engines attached to the outer tube, sufficient in size, power, and number to draw out of the annular chamber between the stucco tube and the plate-iron tube about one hundred thousand cubic feet of air per minute at a pressure of about one and a half pound per square inch, (say four blowing-engines ninety-six inches diameter of blower, twenty-four inches diameter of steam-cylinder, six feet stroke, forty-four revolutions per minute, delivering twenty-six thousand five hundred and thirty-two cubic feet each, or one hundred and six thousand one hundred and twenty-eight cubic feet total of air per minute; or rotary blowers, such as Baker's, of equal efficiency,) delivering the air thus drawn out of the stucco chamber or tube through the porous stucco wall into the chimney E, of suitable area and height, and thence into the atmosphere.

A' is a second stucco chamber, one hundred feet long and eighteen feet diameter, attached to stucco chamber No. 1, either in line with it or at any angle, or returning alongside, as may be most convenient, and partially separated from it by a suspended disk, F, of sheet-iron or other substance, of about half the area, about thirteen feet diameter, so that the air passing from No. 1 chamber into No. 2 chamber may pass freely through the annular space of about two and a half feet wide between the periphery of the hanging disk and the stucco wall.

C' is a second outer cylindrical tube, one hundred feet long and twenty-three feet diameter, placed outside stucco chamber No. 2, in manner as hereinbefore described. Near the farthest end of annular chamber No. 2 are attached engines D', in size, power, and number sufficient to draw out of the annular chamber No. 2 about twenty-five thousand cubic feet of air per minute, at a pressure of about one and a half pound per square inch, (say one blowing-engine, as before described,) and deliver it by pipes of suitable size (say one pipe of ten feet diameter) into the open entering end of stucco chamber No. 1.

$A^2$ is a third stucco tube or chamber, one hundred feet long and eighteen feet diameter, attached to No. 2 stucco chamber, and partially separated from it by hanging disk $F'$ between, in manner as hereinbefore described.

$C^2$ is a third outer cylindrical tube, one hundred feet long and twenty-three feet diameter, placed, in manner as hereinbefore described, outside No. 3 stucco chamber. Near the farthest end of annular chamber No. 3 are attached engines $D^2$, in sufficient power to draw out of it about twenty-five thousand cubic feet of air per minute, at a pressure of about one and a half pound on the square inch, and deliver it by pipes of suitable size into No. 2 stucco chamber near its entrance.

$A^3$ is a fourth stucco tube or chamber, one hundred feet long and eighteen feet diameter, attached to No. 3 stucco chamber, (with hanging disk $F^2$ between,) in manner as hereinbefore described.

$C^3$ is a fourth cylindrical outer tube, one hundred feet long and twenty-three feet diameter, placed outside No. 4 stucco chamber in manner as hereinbefore described. At the farthest end of No. 4 annular chamber are attached engines $D^3$, sufficient to draw out of it about twenty-five thousand cubic feet of air per minute, at a pressure of about one and a half pound per square inch, and deliver it by pipes of suitable size into stucco chamber No. 3 near its entrance.

$A^4$ is a fifth stucco chamber or tube, one hundred feet long and eighteen feet diameter, attached to No. 4 stucco chamber, and partially separated from it by suspended disk $F^3$, in manner as hereinbefore described.

$C^4$ is a fifth cylindrical outer tube, one hundred feet long and twenty-three feet diameter, placed outside No. 5 stucco chamber, in manner as hereinbefore described. Near the farthest end of annular chamber No. 5 are attached engines sufficient to draw out of it about twenty-five thousand cubic feet of air per minute, at a pressure of about one and a half pound per square inch, and deliver it into No. 4 stucco chamber near its entrance. The farthest end of No. 5 stucco chamber is closed with an air-tight plate-iron disk, with an opening of sufficient size to attach the suction-pipe of a blowing-engine, $D^5$, wherewith to draw the air from it, to be delivered to blast or other furnaces, or to a gas-holder for general purposes.

The apparatus being thus arranged and set to work, the operation will be as follows: The open end of stucco chamber No. 1 will receive three-fourths of the volume of entering air (plus as much more air as is finally delivered for use at the close of the operation) from the atmosphere, and containing the proportion of about four of nitrogen to one of oxygen in volume, and one-fourth of entering air from the annular chamber No. 2 containing a smaller proportion of nitrogen. The entering air will travel along the tube at the rate of about four and a half miles an hour. The suction-engines acting on the No. 1 stucco-chamber wall will draw through it about one hundred thousand cubic feet of air per minute, which filtered air will contain a greater proportion of nitrogen than the average of the air at and near the open end of stucco chamber No. 1, and deliver it to the atmosphere by way of the chimney. The suction-engines acting on the No. 2 stucco-chamber wall will draw through it about twenty-five thousand cubic feet of air per minute, which will be delivered into No. 1 stucco chamber near its entrance. The suction-engines acting on No. 3 stucco-chamber wall will draw through it about twenty-five thousand cubic feet of air per minute, which will be delivered into No. 2 stucco chamber near its entrance. The engines acting on No. 4 stucco-chamber wall will draw through it about twenty-five thousand cubic feet of air per minute, which will be delivered into No. 3 stucco chamber near its entrance. The engines acting on No. 5 stucco-chamber wall will draw through it about twenty-five thousand cubic feet of air per minute, which will be delivered into No. 4 stucco chamber near its entrance. The air remaining in No. 5 stucco chamber, having become rich in oxygen, is continuously removed by suction or blowing engines into blast or other furnaces or gas-holders, as may be desired.

It is obvious that the less the volume of surplus air withdrawn for use the richer it will be in oxygen, and that if a smaller volume than twenty-five thousand cubic feet of air per minute be withdrawn for use from apparatus proportioned as herein described the surplus air will gradually become richer in oxygen.

I do not confine myself to the exact dimensions or divisions of the several chambers named, nor to the number of them. They may be of various sizes and shapes, and more or less numerous. Nor to the pressure or suction on the porous wall named, which may be lighter or heavier; nor to the thickness of the porous wall, which may be more than or not so much as the four inches named; nor to the composition of the porous wall, which may be of other materials than plaster-of-paris, or of plaster-of-paris mixed with other material or materials—such as india-rubber dissolved in sulphide of carbon, or other solvent mixed with the liquids that transform dry plaster-of-paris into stucco—in case a condensing action is desirable, or coarsely-powdered coke or charcoal or other porous matter; nor to the quantity of nitrogen that would be removed by an apparatus such as is herein described, which may be increased or diminished by more or less numerous filtrations.

I claim herein as my invention—

A series of air-tight tubular chambers containing smaller chambers of similar shape with porous walls, and open at one end of the series to the air, in combination with air-pumps and suitable connections, the whole adapted to cause a current of air to pass successively through the porous walls of the interior chambers, whereby the nitrogen and oxygen of the air are separated from each other, substantially as described.

JOHN FRANCIS BENNETT.

Witnesses:
  WM. LITTLE,
  GEO. B. MILTENBERGER.